Patented July 30, 1929.

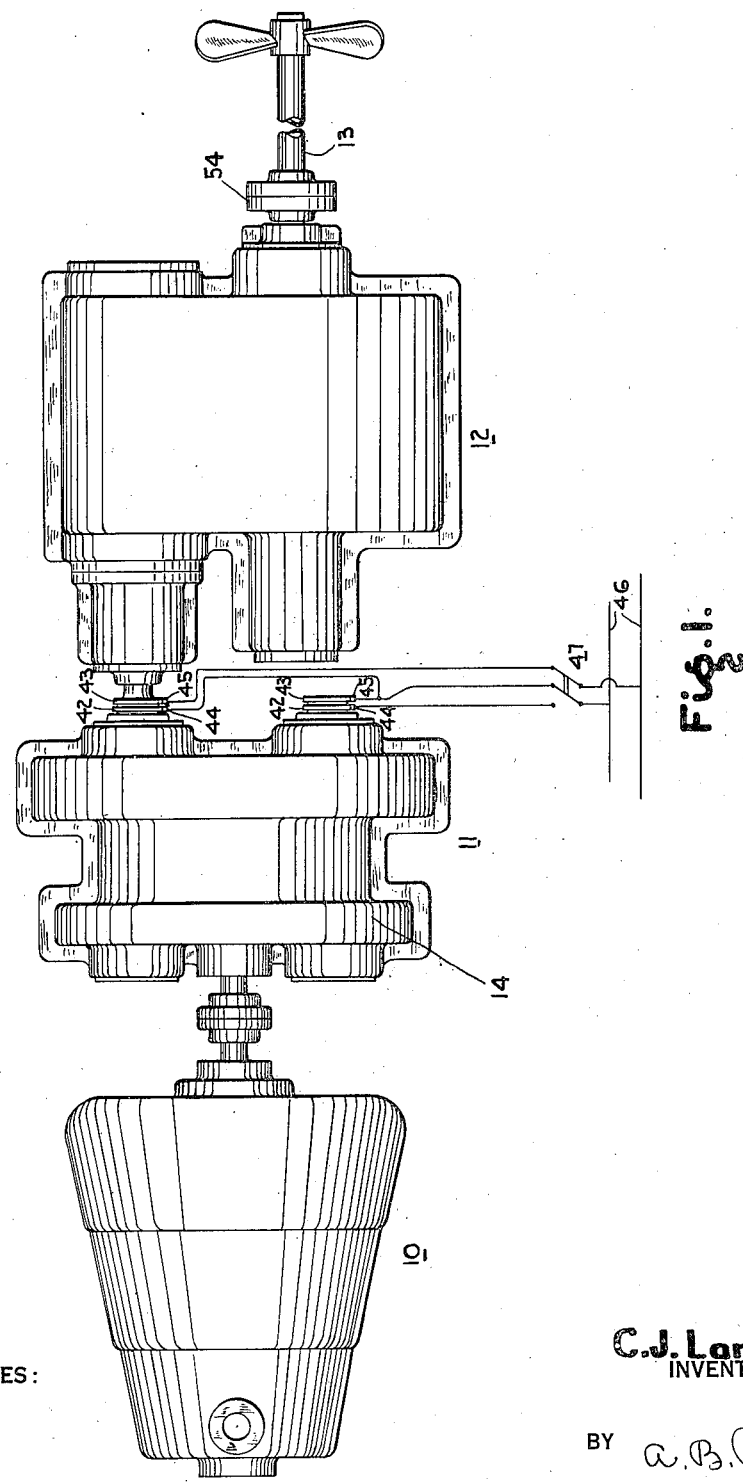

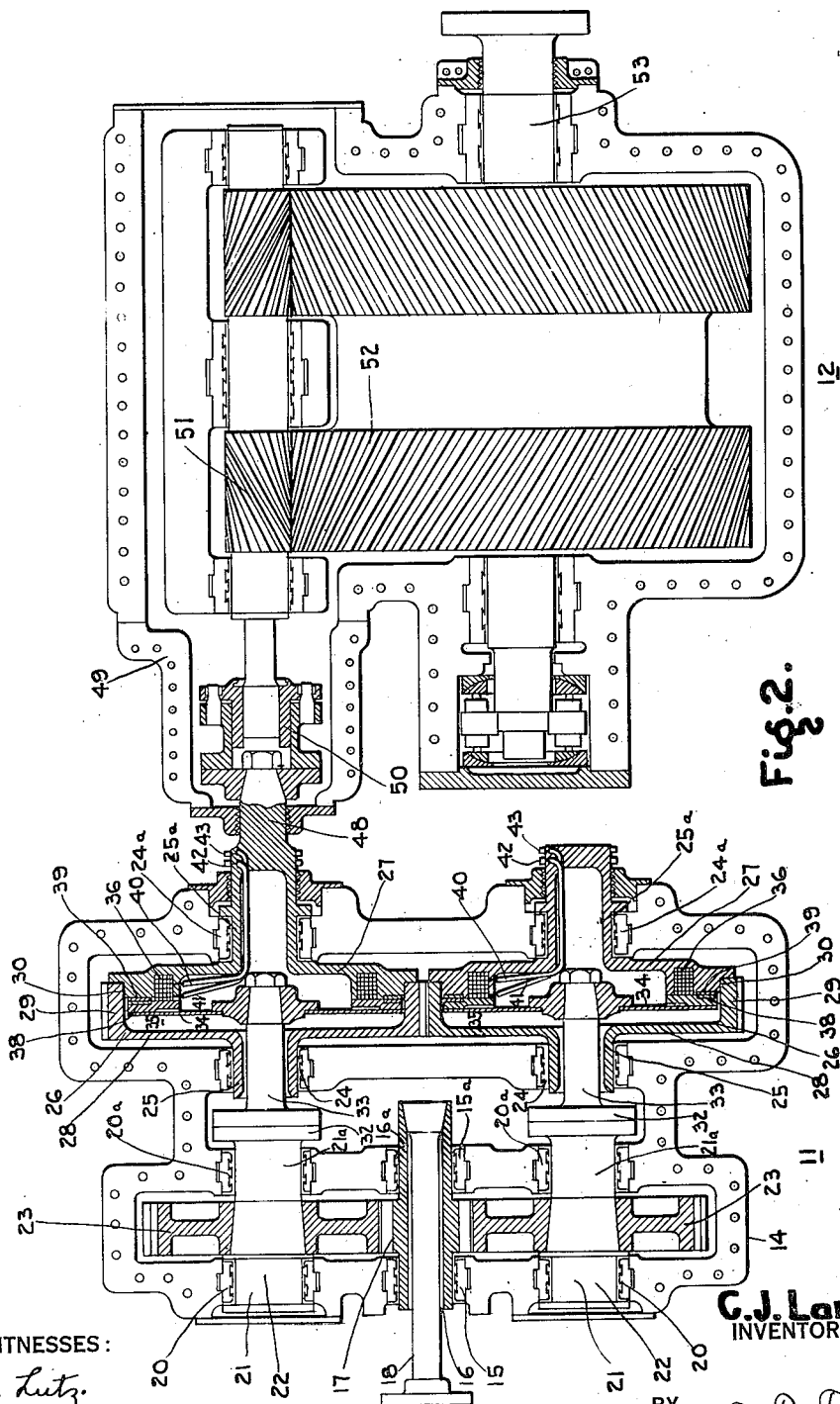

1,722,302

UNITED STATES PATENT OFFICE.

CARL J. LAMB, OF PHILADELPHIA, PENNSYLVANIA, ASSIGNOR TO WESTINGHOUSE ELECTRIC & MANUFACTURING COMPANY, A CORPORATION OF PENNSYLVANIA.

REVERSIBLE REDUCTION GEARING.

Application filed November 27, 1926. Serial No. 151,081.

My invention relates to speed reduction transmission mechanisms for prime movers of the uni-directional type, such, for example, as simple, single-flow steam turbines, and it has for its object to provide apparatus of this character which shall permit of ready reversal of motion.

In the application of steam turbines, as well as some types of internal combustion engines, to marine propulsion, it is desirable, not only to reduce the prime mover speeds suitable for propellers, but also to provide for reversal of motion for astern operation. The latter result has heretofore usually been obtained either by a reverse or astern turbine section, or by the electric drive, the electric drive, of course, permitting of the use of a simple, single-flow, standard ahead turbine. With the object in view of obtaining the advantage of the electric drive from the standpoint of turbine simplification and, at the same time, of avoiding the expense and complication of the electric drive, I have devised a forward and reverse reduction gear unit for interposition between the turbine and a second reduction gear unit. Such an arrangement is more economical, requires less space, and is more efficient than an electric drive. This arrangement is particularly suitable where a great amount of astern or reverse operation is required, as with ferry and tug boats; and, due to the great total speed reduction, whether for forward or reverse operation, it is possible to use high-speed prime movers, thereby making it possible to reduce the space requirements of the power plant.

Apparatus made in accordance with my invention is illustrated in the accompanying drawings, forming a part of this application, in which:

Fig. 1 is a plan view of a marine power installation showing my invention applied thereto; and Fig. 2 is a view, with the gear case covers removed, showing my improved gearing, partly in plan and partly in section.

Referring to the drawings more in detail, in Fig. 1, I show a turbine, at 10, connected to a forward and reverse gear unit, at 11, the latter being connected to the reduction gear unit, at 12, which is operatively connected to the propeller shaft 13.

Referring first to the forward and reverse gearing unit, at 11, I show a gear casing 14 having opposed bearings 15 and 15$^a$ for the journals 16 and 16$^a$ of a quill pinion 17, a turbine shaft 18 extending through the quill pinion and being connected to the outermost portion of the journal 16$^a$, so as to constitute the well-known type of "quill drive".

The casing 14 is provided with aligned bearings 20 and 20$^a$ for journals 21 and 21$^a$ carried by stub shafts 22, the latter having secured thereto intermediate gears 23, which mesh with the quill pinion 17.

The gear casing 14 is also provided with bearings 24 and 24$^a$ for the hollow journals 25 and 25$^a$ of the multiple part, hollow, intermeshing gears 26. The pairs of aligned bearings 24 and 24$^a$ are, respectively, in alignment with the pairs of bearings 20 and 20$^a$. The two intermeshing gears 26 are comprised of web portions 27 and 28, the web portions 28 terminating in gear rims 29, each of the latter overlapping and being joined to the web portions 27 in any suitable manner, as indicated at 30.

The shafts 22 are connected by couplings 32 to stub shafts 33 of smaller diameter, the latter extending through and being spaced from the hollow journals 25 and having connected to the ends thereof remote from the couplings 32 the armature members 34 of the magnetic clutches at 35. The other elements of the magnetic clutches are comprised of ring coils 36 carried by the web members 27. Friction elements 38 and 39 are carried by the armature elements 34 and by the web portions 27, respectively, in order to increase the friction or gripping action of the clutches.

The coils 36 have their terminals connected to conductors 40 and 41, the latter leading, respectively, to slip rings 42 and 43 carried by portions of the journals 25$^a$ extending beyond the gear case. Brushes 44 and 45 engage with the rings 42 and 43, respectively, and they are connected in any suitable manner to the supply line 46 through the intermediary of a reversing switch, at 47. The switch 47 is capable of establishing alternatively an electric circuit through either of the coils 36, thereby rendering effective the clutch whose coil is energized.

From the structure so far described, it will be apparent that the armature elements 34 of the clutches are driven continuously but in opposite directions. If one of the clutches, at 35, is energized, the associated hollow gear 26 will be connected to the aligned intermediate gear 23 and the intermeshing hollow gear 26 will be driven idly by the positively connected hollow gear 26 but in a reverse direction. Therefore, with the turbine shaft 18 running in the same direction, the intermeshing hollow gears 26 may be caused to operate either in one direction or the other, depending upon which of the magnetic clutches is energized.

In order to further reduce the speed of the intermeshing hollow gears 26, I show one thereof having its journal extended, as shown, at 48, through a suitable opening in the housing 49 of the second reduction gear at 12, the extension 48 being connected by any suitable coupling 50 to a pinion 51 meshing with a driven gear 52, the latter having a journal 53 extending beyond the gear case 49 and connected by a suitable coupling 54 to the propeller shaft 13.

From the foregoing, it will be apparent that I have devised a marine propulsion gearing installation which is capable of obtaining a very high speed reduction and of driving either ahead or astern at the same speed ratio, it being only necessary to energize one or the other of the magnetic clutches, at 35, to secure ahead or astern operation.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. In a reversing reduction gear, the combination of a frame having forward lateral and forward intermediate pairs of alined bearings whose axes are parallel, and rearward pairs of bearings alined with said lateral pairs; a pinion journalled in said intermediate pair of bearings; gears meshing with said pinion; shaft members for supporting the gears, supported by the forward lateral pairs of bearings, and extending rearwardly through the forward ones of said rearward pairs of bearings; meshing gears having journal portions fitting the rearward pairs of bearings, each of said last-mentioned gears including a forward journal, web and gear part and a rearward web and journal part secured to the forward part and providing an interior chamber; and clutch means embodying elements arranged interiorly of said chambers and connected to said shaft members and embodying cooperating elements provided interiorly of the chamber and connected to the last-mentioned gears.

2. In a reversing reduction gear, the combination of a frame having forward lateral and forward intermediate pairs of alined bearings whose axes are parallel, and rearward pairs of bearings alined with said lateral pairs; a pinion journalled in said intermediate pair of bearings; gears meshing with said pinion; shaft members for supporting the gears, supported by the forward lateral pairs of bearings, and extending rearwardly through the forward ones of said rearward pairs of bearings; meshing gears having journal portions fitting the rearward pairs of bearings, each of said last-mentioned gears including a forward journal, web and gear part and a rearward web and journal part secured to the forward part and providing an interior chamber; clutch means embodying elements arranged interiorly of said chambers and connected to said shaft members and embodying cooperating elements interiorly of the chamber and connected to the last-mentioned gears; and actuating means for the clutch means including elements carried by the web and journal portions of said rearward parts and extending outwardly of said frame.

In testimony whereof, I have hereunto subscribed my name this nineteenth day of November, 1926.

CARL J. LAMB.